Sept. 11, 1956  W. E. ROBERTSON  2,762,225
CLUTCH OPERATOR
Filed July 21, 1950

Inventor:
William E. Robertson.
By Henry Fuchs
Atty.

United States Patent Office 2,762,225
Patented Sept. 11, 1956

2,762,225

CLUTCH OPERATOR

William E. Robertson, Wilmette, Ill., assignor to W. H. Miner, Inc., Chicago, Ill., a corporation of Delaware Application July 21, 1950, Serial No. 175,252

1 Claim. (Cl. 74—104)

This invention relates to improvements in manually actuated hand brakes of the power multiplying type, comprising a chain winding drum, worm and worm gear operated means for rotating the drum, clutch means for connecting the drum to the worm gear for rotation in unison therewith, and means for shifting the clutch to release the brakes.

One object of the invention is to provide in a manually operated, power multiplying hand brake mechanism for railway cars, having releasable clutch means for effecting quick release of the brakes, simple and efficient means for actuating the clutch means.

A more specific object of the invention is to provide in a brake mechanism of the character indicated a sliding clutch member connecting the worm gear to the chain winding drum, wherein the clutch member is held in clutching engagement with the drum by spring means, and wherein means is provided for releasing the clutch member from operative engagement with the drum, comprising a lever operated pull rod which has shouldered engagement with the clutch member.

Other objects of the invention will more clearly appear from the description and claim hereinafter following.

Figure 1:
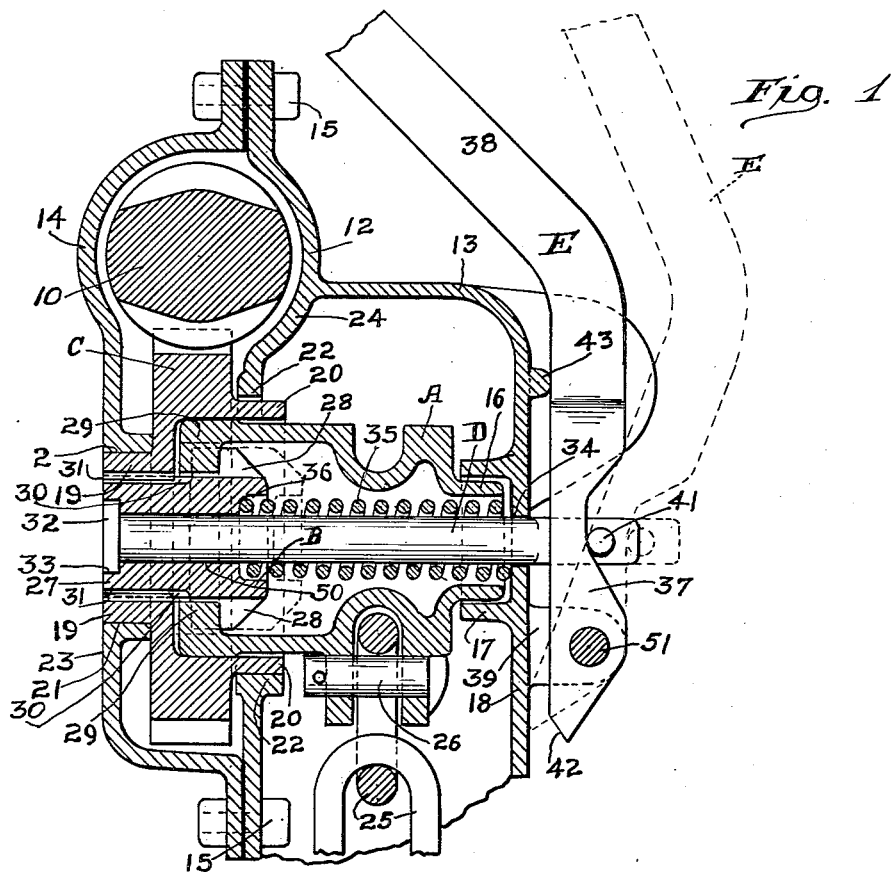
Figure 2:
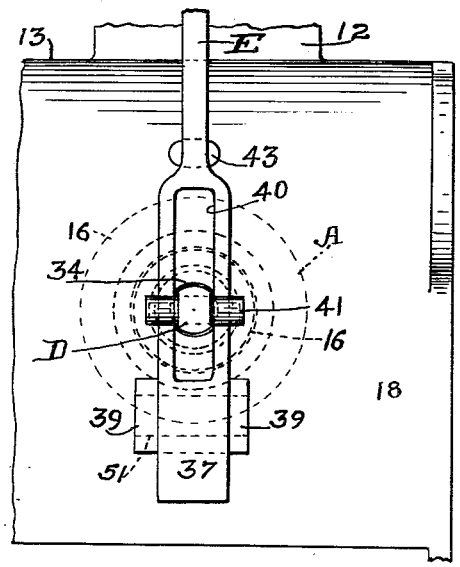

In the accompanying drawing forming a part of this specification, Figure 1 is a transverse, vertical sectional view, partly broken away, of a power multiplying worm gear actuated brake mechanism, illustrating my improvements in connection therewith. Figure 2 is a side elevational view, looking from right to left in Figure 1.

In the present instance, my improvements are shown as embodied in a well-known type of hand brake mechanism of the worm gear type, similar to the mechanism disclosed, for example, in Patent No. 2,121,095, granted to Roland J. Olander, June 21, 1938.

My improved mechanism comprises broadly a chain winding drum A, a sliding clutch member B connecting the chain winding drum to the rotary actuating means of the brake mechanism, including the usual worm gear C with which the clutch element has a splined connection, and means for shifting the clutch member B comprising a pull rod D and an actuating lever E.

As shown most clearly in Figure 1, the worm gear C is driven by the usual worm member 10, which is rotated by the hand wheel of the brake, not shown.

The operating parts of the improved brake mechanism are contained in a vertically divided, two part housing 12, comprising a main section 13 and a cover section 14 secured to the main section by bolts 15—15. The main section 13 of the housing contains the chain winding drum A, which is hollow and has a cylindrical portion 16 of reduced diameter at its right hand end, as seen in Figure 1, journaled in an inwardly extending bearing sleeve 17 on the right hand vertical side wall 18 of the housing section 13. The opposite or left hand end of the drum is rotatably supported by the worm gear C, which has hollow hub portions 19 and 20 at opposite sides thereof journaled in bearing openings 21 and 22 provided in the vertical walls 23 and 24 of the cover section 14 and the main section 13 of the housing. As shown, the left hand end of the drum, as viewed in Figure 1, is journaled in the hollow hub 20 of the worm gear C. The brake chain 25, which is windable on the drum A and leads to the brake mechanism proper of the car, is anchored to the drum by a pin 26.

The clutch member B comprises a cylindrical shank 27 provided with clutch teeth 28 at its right hand end, engageable with internal teeth 29 on the drum A. The cylindrical shank 27 is provided with lengthwise extending ribs 30—30 engaged between lengthwise extending, interior projections 31—31 provided on the hub 19 of the worm gear C. The clutch member B is thus splined to the worm gear C for rotation in unison therewith.

The pull rod D is engaged through an axial bore 50 in the clutch member B and has a head 32 at its left hand end seated in a depression 33 at the left hand end of the member B. The pull rod D extends through an opening 34 in the wall 18 of the housing section 13, and projects outwardly beyond said wall.

The clutch member B is urged toward its engaged position by a coil spring 35 surrounding the pull rod D and having its opposite ends bearing, respectively, on the wall 18 of the housing and the inner end of the clutch member, the latter being provided with a central seat 36, which accommodates this end of the spring.

The actuating lever E comprises a vertical lower end section 37 and a laterally inwardly inclined, upper handle portion 38, which normally extends over the top of the housing 12. The section 37 of the lever E extends to a point below the pull rod D and is pivotally supported at its lower end on a pivot pin 51, which extends through said section and has its opposite ends supported in spaced, outstanding lugs 39—39 on the wall 18 of the housing section 13. The section 37 is vertically slotted above the pivot thereof, as indicated at 40, to accommodate the outer end of the rod D. The rod D projects outwardly beyond the section 37 and has a transverse stop pin 41 extending through the same at right angles to the length of said rod. The stop pin 41 is engageable by the section 37 of the lever E when the latter is swung to the right to effect disengagement of the clutch member B from the drum A through pulling action of the rod D. Swinging movement of the lever E to the right is limited by engagement of the lower end portion 42 of the lever with the housing wall 18, and swinging movement thereof to the left is limited by a projecting stop 43 on the wall 18 of the housing section 13 with which the inner side of the upper end portion of the vertical section 37 of the lever is engageable. The spring 35 effects reengagement of the clutch member B when the lever E is released.

I claim:

In a mechanism of the character described, the combination with a rotatable axially shiftable member supported for sliding movement; of a spring abutment opposed to one end of said member; a pull rod extending through said spring abutment and member and having a head at one end in shouldered engagement with the opposite end of said member; a coil spring surrounding said rod and bearing at one end on said first named end of said member and at the other end on said spring abutment; a lever having a forked portion through which the end of said pull rod remote from the head end thereof extends, said lever being pivoted near its lower end for swinging movement; and a pin on that end of said rod which extends through the lever, with which pin the outer edge of the lever is engageable when swung toward said pin to shift said pull rod to force said member toward said spring.

(References on following page)

References Cited in the file of this patent

UNITED STATES PATENTS

| | | |
|---|---|---|
| 439,628 | Boston | Nov. 4, 1890 |
| 512,258 | Murrey | Jan. 2, 1894 |
| 564,488 | Johnson | July 2, 1896 |
| 1,110,519 | Wigle | Sept. 15, 1914 |
| 1,317,290 | Haussmann | Sept. 30, 1919 |
| 1,612,481 | Welter | Dec. 28, 1926 |
| 2,457,764 | Williams | Dec. 28, 1948 |